United States Patent [19]

Seki

[11] 4,334,706
[45] Jun. 15, 1982

[54] GUARD MOLDING FOR OUTER SURFACES OF A CAR

[75] Inventor: Shojiro Seki, Yokohama, Japan

[73] Assignee: Nissan Motor Company, Limited, Yokohama, Japan

[21] Appl. No.: 153,525

[22] Filed: May 27, 1980

[30] Foreign Application Priority Data

May 28, 1979 [JP] Japan ............................ 54/71988[U]

[51] Int. Cl.³ ............................................ B60R 13/04
[52] U.S. Cl. ....................................... 293/126; 428/31
[58] Field of Search ............... 293/102, 117, 120, 126, 293/127, 128, 154, 155; 280/770; 428/31

[56] References Cited

U.S. PATENT DOCUMENTS 3,290,082 12/1966 Fritsch .................................. 293/128
3,309,129  3/1967 Newman et al. ..................... 293/128
3,574,379  4/1971 Jordan ................................. 293/120
3,606,432  9/1971 Honatzis ............................. 293/128

FOREIGN PATENT DOCUMENTS 2706121  8/1977 Fed. Rep. of Germany ...... 280/770

Primary Examiner—Joseph F. Peters, Jr.
Assistant Examiner—Ross Weaver
Attorney, Agent, or Firm—Schwartz, Jeffery, Schwaab, Mack, Blumenthal & Koch

[57] ABSTRACT

Guard molding for outer surfaces of a car prevents damage of the finished body due to light contact with other cars and the like. Some end portions of the guard molding are formed as stepped recesses so as not to interfere with adjacent parts or to refine the appearance. A plate-like end cap is adhered on the stepped end surface to prevent exposure of hollow inner space of the molding and the material filled in the space.

10 Claims, 9 Drawing Figures

GUARD MOLDING FOR OUTER SURFACES OF A CAR

BACKGROUND OF THE INVENTION

The present invention relates to a guard molding which is adhered longitudinally on each outer side surface of a car to prevent damages of the side surface due to light contact with other cars or articles and to refine the appearance.

Conventional solid guard molding is shown in FIG. 1, which is denoted by reference numeral 1 and extends longitudinally between front and rear edges of a door 2. FIGS. 2A and 2B show that, when the door 2 is opened about a pivot center 4, side edge portion of the guard molding 1 may interfere with an adjacent part 3, e.g. a fender or another door. Thus, in order to avoid such an interference, one end portion of the guard molding 1 is usually formed as a stepped recess 5, as shown in FIG. 3. The recess 5 may be formed at the end portion of the guard molding 1 for another reasons, e.g. to improve the appearance of the car. As the recess 5 is normally formed by machining, traces of machine tool remain visible from outside, impairing the appearance of the edge portions of the guard molding.

As shown in FIG. 4A, another type of conventional guard molding 6 has an outer shell 6a forming therein a hollow space 6b, which may be filled with foamed plastic material 6c (FIG. 4B). Although such structures are light in weight and less costly, when the edge portion of the guard molding 6 is recessed, the inner hollow space 6b or the foamed plastic material 6c filled therein is exposed so that the intended sharp appearance of bright decorative coating 7 on the guard molding 6 cannot be actually obtained. Thus, in order to avoid such an exposure, an end cap 8 having a recess 8a, as shown in FIG. 5, is usually connected to the end portion of the guard molding 6 which itself is not recessed. However, the guard moldings 1 and 6 are formed by extrusion process whereas the end cap 8 is formed by die casting, so that the molding 6 and the end cap 8 cannot be precisely aligned and the connection between these parts remains conspicuous. By this, a refined appearance is not achieved. Further, when the decorative coating 7 is applied on the guard molding 6, similar coating should be applied by plating on the portion of the end cap 8 connected with the decorative coating 7. Thus, the cost of the end cap 8 is increased. As the end cap 8 is solid and relatively heavy, merit of the weight reduction by the hollow guard molding 6 filled with foamed plastic material is cancelled.

SUMMARY OF THE INVENTION

Therefore, it is a primary object of the present invention to mitigate the above mentioned disadvantages and to provide a guard molding having an improved end cap which is less expensive and can be easily formed to cover the stepped recess of the end portion of the guard molding.

According to the present invention, a guard molding, which is attached along the outer surface of a car and formed with a stepped recess at the end portion, comprises a relatively thin plate-like end cap adapted to conform with and adhered to the end surface of the stepped recess.

As the end cap according to the present invention is a relatively thin plate-like member, the end cap can be easily manufactured and contributes to refine the appearance of the car.

DESCRIPTION OF A PREFERRED EMBODIMENT

Figure 1:
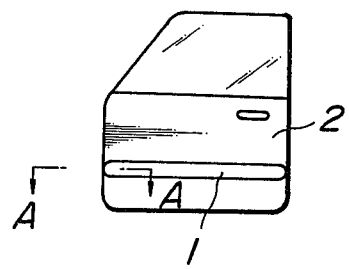
FIG. 1 is a side elevation of a car door.
Figure 6:
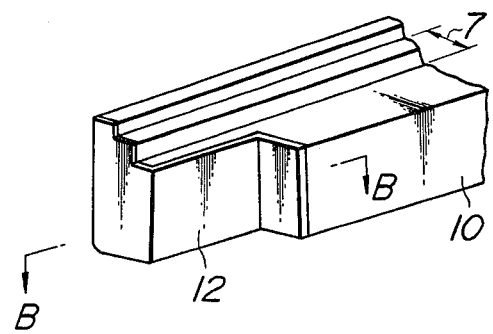
FIG. 6 is a perspective view of an end portion of a guard molding, according to the present invention.
Figure 7:
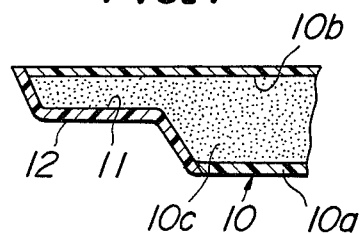
FIG. 7 is a sectional view taken along the line B—B of FIG. 6.

Referring to FIGS. 6 and 7, a guard molding 10, according to the present invention, includes an outer shell 10a forming therein a hollow space 10b which may be filled with foamed plastic material 10c. The guard molding 10 extends along the entire width of the door 2 (FIG. 1). One end portion of the guard molding 10 is stepped to form a recess 11 as shown in FIG. 7.

According to the present invention, a relatively thin plate-like end cap 12, which conforms with the end portion of the guard molding and the stepped recess 11, is adhered to the end surfaces of the shell 10a and the plastic material 10c. Preferably, the end cap 12 consists of a material used to form the outer shell 10a of the molding 10.

Figure 2A:
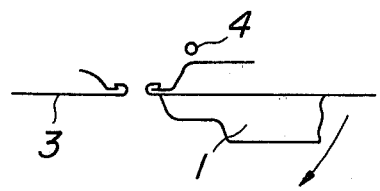
FIGS. 2A and 2B are enlarged sectional views taken along the line A—A of FIG. 1 illustrating the open and closed positions of the door, respectively.
Figure 2B:
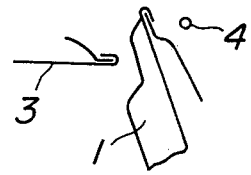
Figure 3:
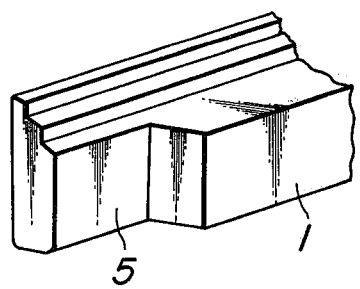
FIG. 3 is a perspective view of an end portion of a known guard molding.
Figure 4A:
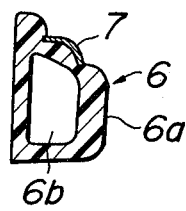
FIGS. 4A and 4B are sectional views of known guard moldings.
Figure 4B:
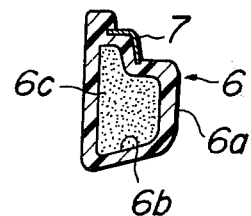
Figure 5:
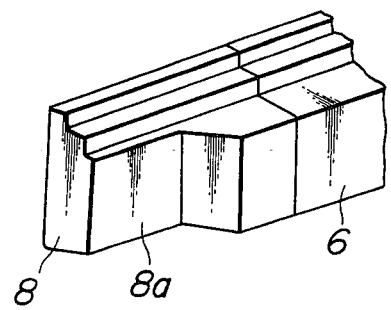
FIG. 5 is a perspective view of an end portion of another known guard molding.

As the guard molding 10 according to the present invention has the stepped recess 11, the guard molding 10 does not interfere with the adjacent part, e.g. another door, body or fender (FIGS. 2A and 2B).

Since the end cap 12 completely covers the stepped recess 11 and the end of the guard molding 10, a refined appearance can be obtained even when the guard molding 10 is fomred by the outer hollow shell 10a and the formed plastics 10c filled in the hollow space 10b, which otherwise would be exposed to impair the appearance.

As the guard molding 10 extends along substantially the entire width of the door 2, the decorative coating 7 is available for the entire width without any interruption. The relatively thin end cap 12 need not be formed with decorative coating to be connected with the coating 7 of the molding 10.

Moreover, the end cap 12 is very light in weight. Thus, the guard molding 10 with the end cap 12 according to the present invention is relatively cheap, light in weight, and easy to manufacture as compared with the known guard molding 6 with the solid end cap 8.

What is claimed is:

1. A guard molding adhered along an outer surface of a vehicle, comprising:
   (a) a single piece outer shell in direct attachment to the outer surface;
   (b) an end portion of said outer shell stepped to form a recess; and
   (c) an end cap of constant thickness, said end cap conforming with and being adhered on the end portion and the outer surface of the stepped recess of the guard molding.

2. The guard molding as claimed in claim 1, wherein the end cap consists of a material used to form the guard molding.

3. The guard molding as claimed in claim 1, wherein said outer shell forms therein a hollow space, one end of the shell being formed as said stepped recess.

4. The guard molding as claimed in claim 3, wherein the hollow space is filled with foamed plastic material.

5. A guard molding as claimed in claim 1, wherein said stepped recess is free from interference with adjacent vehicle parts.

6. A guard molding as claimed in claim 1, wherein said end cap completely covers said stepped recess and said end portion of the guard molding.

7. A guard molding as claimed in claim 1, wherein the molding extends along the entire width of the door.

8. A guard molding as claimed in claim 1, further comprising a decorative coating attached to the outer surface of said molding.

9. A guard molding as claimed in claim 9, wherein said decorative coating extends the length of said molding without interruption.

10. A guard molding as claimed in claim 6, wherein said decorative coating covers said end cap.

* * * * *